Sept. 25, 1928.  A. J. MICHAUD  1,685,552

TIRE AND RIM

Filed Feb. 19, 1927  2 Sheets-Sheet 1

Arthur J. Michaud, Inventor

By Marion & Marion, Attorneys

Sept. 25, 1928.
A. J. MICHAUD
TIRE AND RIM
Filed Feb. 19, 1927
1,685,552
2 Sheets-Sheet 2
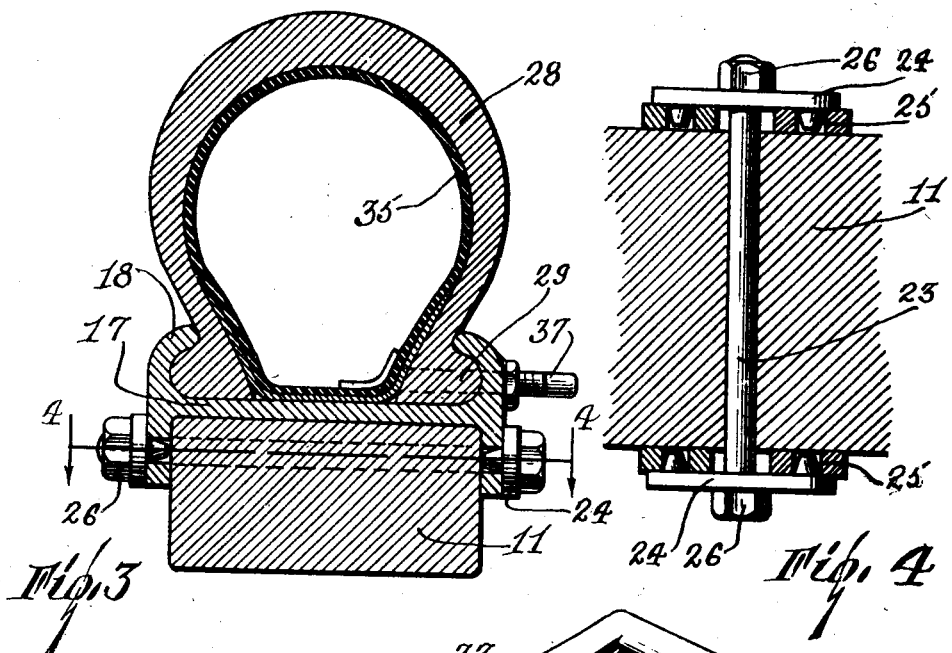
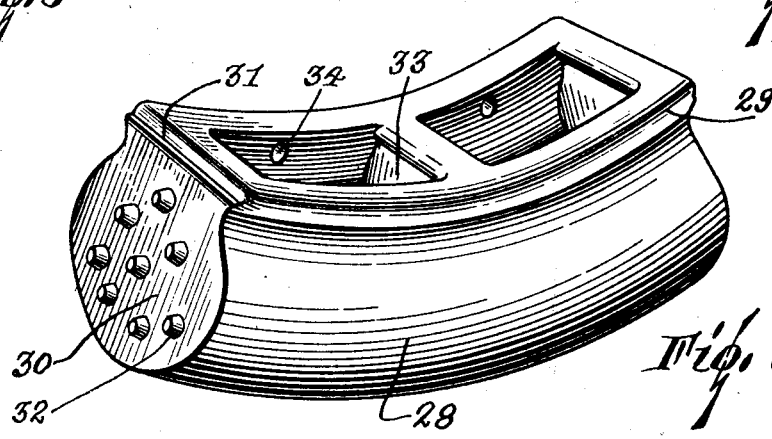
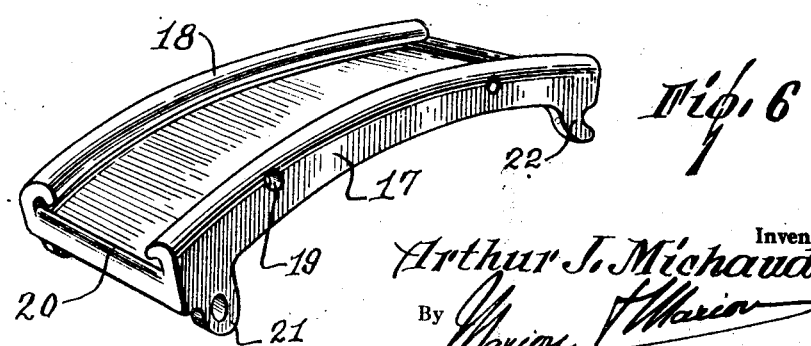
Inventor
Arthur J. Michaud
By Marion & Marion
Attorneys Patented Sept. 25, 1928.

1,685,552

UNITED STATES PATENT OFFICE.

ARTHUR JOSEPH MICHAUD, OF MONTREAL, QUEBEC, CANADA.

TIRE AND RIM.

Application filed February 19, 1927. Serial No. 169,650.

The present invention relates to improvements in vehicle tire and rim structures and has for its primary object to provide a sectional tire.

A further object of the invention is the provision of a sectional rim structure designed for co-operation with sectional tires and arranged for detachable connection with a vehicle wheel.

Another object of the invention is the provision of a tire and rim structure arranged for radial connection with the felly of a wheel to facilitate the repair of a tire.

Another object of the invention is the provision of a pneumatic tire composed of a plurality of detachably connected sections each formed with one or more compartments adapted to receive sectional inner tubes.

Still another object of the invention is the provision of a pneumatic tire constructed so that a puncture through one portion will cause the deflation of a relatively small area so that the major portion of the tire will remain in proper inflated condition.

Still another object of the invention is the provision of a tire and rim constructed for rapid and convenient connection upon a wheel and which can be manufactured at a relatively low cost.

Other objects and advantages will become apparent as the description progresses.

In the accompanying drawing forming a part of this specification and in which like reference characters are employed to designate corresponding parts throughout the same—

Figure 3 is an enlarged transverse sectional view taken on the line 3—3 of Figure 1;

Figure 4 is a similar view taken on the line 4—4 of Figure 3;

Figure 5 is a perspective view of one of the tire casing sections; and

Figure 6 is a similar view of one of the rim sections.

Figure 1:
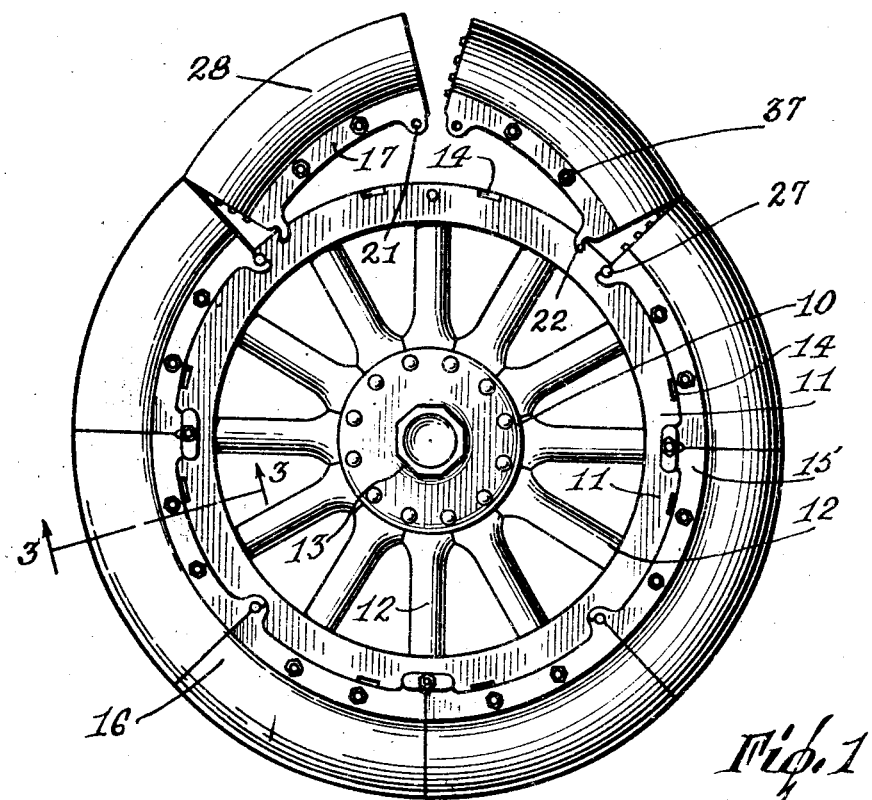
Figure 1 is a side elevational view of a vehicle wheel showing my improved tire and rim structure mounted in operative position thereon.
Figure 2:
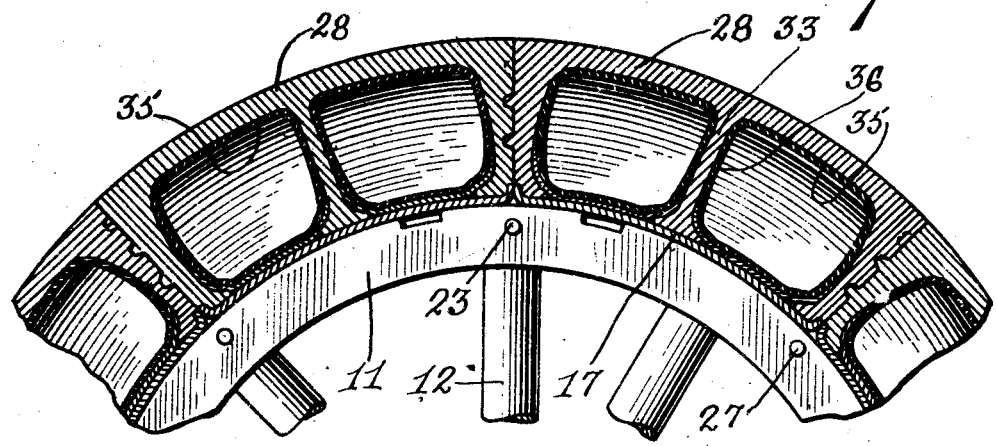
Figure 2 is an enlarged longitudinal sectional view through the tire and rim structure.

Referring to the drawings wherein for the purpose of illustration is shown a preferred embodiment of my invention, the numeral 10 generally designates a conventional type of automobile wheel embodying an annular felly 11 connected by means of spokes 12 with a central hub 13. The exterior periphery of the felly 11 is provided with a plurality of transversely extending grooves 14 the purpose of which will later appear.

My invention relates particularly to an improved sectional rim structure 15 carrying corresponding sections of an asembled tire 16. The rim 15 is composed of a plurality of equal segments 17 the cross sectional formation conforming generally to the usual structure of a clincher rim and formed with inwardly curved clincher flanges 18 at the longitudinal edges arranged to engage the bead of a tire casing. As clearly illustrated in Figure 6 one of the flanges 18 is formed with a pair of transversely extending openings 19 formed adjacent the ends of the segment. The transverse end edges of each rim segment 17 are formed with an upwardly turned rib 20 extending between the flanges 18. Formed adjacent one end of each rim segment in directly opposed positions on the edges and extending radially therefrom are a pair of apertured ears 21, the opposite end being formed with a pair of opposed projections 22 forming substantially semi-circular hooks. For the purpose of connecting the rim sections to the felly 11 of the wheel 10 a series of bolts 23 are extended transversely through the felly, the intermediate portions of the bolts being firmly secured in the felly while the ends project beyond the edges and are screw threaded. These bolts are arranged at regular intervals about the felly adjacent the periphery thereof.

Adapted for slidable engagement with the ends of the bolts 23 are elongated clamping plates 24 formed with tapered pins 25 on one side adjacent the ends. The centre of each clamp is formed with an opening engageable with the ends of the bolts. In assembled position, the pins 25 of the clamping plates engage the apertures of the ears 21 of the rim segments and are secured in position by nuts 26 threaded on the ends of the bolts.

Arranged in alternate positions with the bolts about the peripheral edge of the felly are a plurality of transversely extending pins 27 projecting slightly beyond the side edges of the felly and engageable with the hooks 22 of the adjacent rim sections. Thus, the rim sections may be detachably secured in continuous circular position about the periphery of the felly to support a tire casing in position.

An essential feature of the present invention resides in providing a sectional tire casing 16 divided to form a plurality of co-extensive segments arranged to be fitted on the corresponding segments of the rim 15. Each casing segment designated by the numeral 28 conforms in cross section to the common forms of clincher casings now in use including a bead 29 engageable with the clincher flanges 18 of the rim sections. The ends of each casing segment 28 are enclosed by means of transverse end walls 30 the inner edges of which are formed with rabbeted grooves 31 for snug engagement with the transverse ribs 20 of the rim section. One of the end walls 30 of each casing segment is formed with a plurality of outwardly extending tapered projections 32 while the opposite end wall is formed with tapered recesses corresponding to and registering with the projections 32 of the adjacent segment. In the particular embodiment of the casing sections illustrated, a transverse partition 33 is formed on the longitudinal centre of each section, dividing the section into two complementary compartments. Formed in one side of the tire adjacent its inner edges and extending through the bead thereof are openings 34 adapted to aline with the openings 19 formed in each rim segment.

Each of the compartments formed in the casing sections is inflated by means of an inner tube section 35 conforming in transverse section to the formation of the casing compartments and having the ends enclosed by end walls 36 forming individual inner tube sections for inflation of the casing. Each inner tube section 35 carries an inflating valve embodying a cylindrical valve body 37 threaded adjacent its outer end. The valves 37 extend through the openings 34 and 19 of the casing and rim sections respectively and project substantially beyond the edge of the rim as shown in Figure 3, for connection of an air tube. The inner tube sections 35 are preferably constructed of elastic material such as rubber and conform to the contour of the casing compartments.

In use, the rim and casing sections are initially connected and then assembled on the wheel. As illustrated in Figure 1, the present example is divided to provide eight component sections, one end of each rim section being firmly secured to the wheel felly by the clamping plates 24 while the opposite end is locked against displacement by connection of the curved projections 22 with the pins 27. The ends of the casing sections are arranged in contacting positions and secured against lateral displacement by the projections 32 which engage the complementary recesses in the opposed end wall of the adjacent section. From this construction it will readily be seen that any one of the casing and rim sections may be removed from the wheel without removal of the remaining sections with the exception of a slight displacement of one of the adjacent sections.

In the event of a puncture of the tire casing and deflation of one of the compartments the deflated area will be relatively small so that the vehicle can safely proceed until such time as the inner tube section can be conveniently replaced. Furthermore, the cost of replacing the inner tube sections will be substantially decreased as one of the small sections could be sold at a greater reduced cost over the continuous inner tube now commonly employed. It will also be noted that the particular arrangement of the sections will obviate the accumulation of foreign matter between the segments due to the transverse rib structure formed at the ends of each rim section fitting closely together to eliminate the formation of pockets or recesses. The sections may be conveniently removed from the wheel by disconnecting the nuts 26 from the bolt adjacent the section to be removed and removing the clamping plates 24. An elongated instrument such as a screw driver, is then inserted in the transverse grooves 14 so as to extend the rim section by the leverage of the instrument.

It is to be understood that the form of my invention herewith shown and described is to be taken as the preferred example of the same, and that various changes as to the shape, size and arrangement of parts may be resorted to without departing from the spirit of the invention or the scope of the subjoined claim.

Having thus described my invention, I claim:

In combination with a vehicle wheel provided with a plurality of transversely extending bolts and pins, a plurality of rim sections formed with casing engaging flanges, apertured ears formed adjacent one end of each rim section, curved projections formed on the opposite end of each rim section engageable with the pins of the wheel, and clamping plates formed with inwardly extending pins engageable with the ears of the rim section and with the bolts to secure the rim sections in position on the wheel.

In witness whereof I have hereunto set my hand.

ARTHUR JOSEPH MICHAUD.